(12) United States Patent
Desai (10) Patent No.: US 9,667,790 B1
(45) Date of Patent: May 30, 2017

(54) METHOD AND SYSTEM FOR CONVEYING CONTEXT DATA IN A MULTI-CHANNEL AND OMNI-CHANNEL ENVIRONMENT

(71) Applicant: JPMorgan Chase Bank, N.A., New York, NY (US)

(72) Inventor: Prashant Desai, Land O Lakes, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 50 days.

(21) Appl. No.: 14/681,372

(22) Filed: Apr. 8, 2015

(51) Int. Cl.
*H04M 3/51* (2006.01)
*H04M 3/493* (2006.01)
*H04M 3/523* (2006.01)
*H04L 29/06* (2006.01)

(52) U.S. Cl.
CPC ...... *H04M 3/5191* (2013.01); *H04L 65/1006* (2013.01); *H04M 3/493* (2013.01); *H04M 3/5232* (2013.01)

(58) Field of Classification Search
USPC ..................................... 379/265.09
See application file for complete search history.

(56) References Cited

U.S. PATENT DOCUMENTS

| | | |
|---|---|---|
| 5,638,457 A | 6/1997 | Deaton et al. |
| 5,675,662 A | 10/1997 | Deaton et al. |
| 5,734,838 A | 3/1998 | Robinson et al. |
| 5,784,562 A | 7/1998 | Diener |
| 5,790,785 A | 8/1998 | Klug et al. |
| 5,794,259 A | 8/1998 | Kikinis |
| 5,796,395 A | 8/1998 | De Hond |
| 5,815,657 A | 9/1998 | Williams et al. |
| 5,845,260 A | 12/1998 | Nakano et al. |
| 5,892,900 A | 4/1999 | Ginter et al. |
| 5,898,780 A | 4/1999 | Liu et al. |
| 5,914,472 A | 6/1999 | Foladare et al. |
| 5,915,244 A | 6/1999 | Jack et al. |
| 5,918,239 A | 6/1999 | Allen et al. |
| 5,933,817 A | 8/1999 | Hucal |
| 5,953,710 A | 9/1999 | Fleming |
| 5,958,007 A | 9/1999 | Lee et al. |
| 5,960,411 A | 9/1999 | Hartman |

(Continued)

*Primary Examiner* — Amal Zenati
(74) *Attorney, Agent, or Firm* — Hunton & Williams LLP (57) ABSTRACT

According to an embodiment of the present invention, a system and method for transmitting context data during an automated customer interaction comprises: a computer store containing data, for each customer, defining a customer's historical interactions with an entity and account information, a computer processor, coupled to the computer store and programmed to: receive, via an electronic input, a contact from a customer via an electronic communication channel; automatically capture current interaction data between the customer and an automated interactive entity; receive an electronic request for a live agent from the customer; retrieve, from the computer store, historical interaction data from a prior customer contact and account information; generate context description that comprises information from the current interaction data, historical interaction data and account information; embed the context description into a signal as a header; and transmit the signal with the context description to the live agent.

20 Claims, 4 Drawing Sheets

(56) References Cited

U.S. PATENT DOCUMENTS

| | | |
|---|---|---|
| 5,963,952 A | 10/1999 | Smith |
| 5,969,318 A | 10/1999 | Mackenthun |
| 5,991,751 A | 11/1999 | Rivette et al. |
| 6,005,939 A | 12/1999 | Fortenberry |
| 6,012,088 A | 1/2000 | Li et al. |
| 6,014,636 A | 1/2000 | Reeder |
| 6,014,638 A | 1/2000 | Burge et al. |
| 6,026,429 A | 2/2000 | Jones et al. |
| 6,032,147 A * | 2/2000 | Williams .......... G06F 17/30569 |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,105,012 A | 8/2000 | Chang et al. |
| 6,298,330 B1 | 10/2001 | Gardenswartz et al. |
| 6,389,537 B1 | 5/2002 | Davis et al. |
| 6,499,105 B1 | 12/2002 | Yoshirura et al. |
| 6,820,202 B1 | 11/2004 | Wheeler et al. |
| 7,587,763 B2 | 9/2009 | Yodaiken |
| 7,747,866 B1 | 6/2010 | Everhart |
| 8,032,936 B2 | 10/2011 | Yodaiken |
| 8,386,381 B1 | 2/2013 | Barton et al. |
| 8,984,276 B2 | 3/2015 | Benson |
| 2004/0123137 A1 | 6/2004 | Yodaiken |
| 2004/0255223 A1 | 12/2004 | Chawla |
| 2008/0052328 A1 | 2/2008 | Widhelm et al. |
| 2009/0261162 A1 | 10/2009 | Kargman et al. |
| 2010/0011444 A1 | 1/2010 | Yodaiken |
| 2010/0281223 A1 | 11/2010 | Wolfe et al. |
| 2014/0270108 A1* | 9/2014 | Riahi ................... G06N 99/005 379/88.01 |

* cited by examiner

METHOD AND SYSTEM FOR CONVEYING CONTEXT DATA IN A MULTI-CHANNEL AND OMNI-CHANNEL ENVIRONMENT

RELATED APPLICATIONS

The application is related to co-pending application, U.S. application Ser. No. 14/681,421, (titled "Method and System for Sensitive Data Abstraction"), filed Apr. 8, 2015, the contents of which are incorporated herein in its entirety.

FIELD OF THE INVENTION

The present invention relates generally to contact center management and more specifically to generating and passing customer context data using Web Real-Time Communication (WebRTC) and Session Initiation Protocol (SIP) in a multi-channel and/or omni-channel environment.

BACKGROUND OF THE INVENTION

Customers, clients and prospects interact with contact centers using multiple channels. These interactions today are contained in each of the channels where data is stored and then delivered separately to the contact centers solution and then eventually to the appropriate agent. Accordingly, each channel operates as a stand-alone silo. Current implementations with Voice over Internet Protocol (VoIP) and Time Division Multiplexing (TDM) in contact centers require third party call control and/or applications to deliver data to the contact center desktop. With WebRTC, the use of telephony through a browser brings about a major disruption to the legacy telephony environment.

Traditional or legacy contact centers use telephony devices, such as a phone on the desk VoIP or TDM or a thick client (soft phone) with H.323 or SIP on the desktop. As a result, additional external applications in the contact centers are needed to provide data from a voice portal or other channels the customer interacted with before reaching the contact center agent.

Other drawbacks may also be present.

SUMMARY OF THE INVENTION

Accordingly, one aspect of the invention is to address one or more of the drawbacks set forth above. According to an embodiment of the present invention, an automated computer implemented system for transmitting context data during an automated customer interaction in a multi-channel environment comprises: a computer store containing data, for each customer, defining a customer's historical interactions with an entity and account information, a computer processor, coupled to the computer store and programmed to: receive, via an electronic input, a contact from a customer via an electronic communication channel; automatically capture current interaction data between the customer and an automated interactive entity; receive an electronic request for a live agent from the customer; retrieve, from the computer store, historical interaction data from a prior customer contact and account information; generate context description that comprises information from the current interaction data, historical interaction data and account information; embed the context description into a signal as a header; and transmit, using a computer processor, the signal with the context description to the live agent.

According to another embodiment of the present invention, an automated computer implemented method for transmitting context data during an automated customer interaction in a multi-channel environment, comprises the steps of: receiving, via an electronic input, a contact from a customer via an electronic communication channel; automatically capturing current interaction data between the customer and an automated interactive entity; receiving an electronic request for a live agent from the customer; retrieving, from a computer store, historical interaction data from a prior customer contact and account information; generating context description that comprises information from the current interaction data, historical interaction data and account information; embedding the context description into a signal as a header; and transmitting, using a computer processor, the signal with the context description to the live agent.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a method and system for passing context information in a contact center environment with a signaling protocol, such as SIP and WebRTC, for example. Context information may include any data relating or relevant to a customer that may be helpful to a live agent and/or other representative in interacting with the customer. A contact center may refer to a centralized entity that receives requests and/or other communications from customers, users, etc. Contact centers may include call centers, help desk, a centralized customer service unit, etc. A contact center may receive requests via phone and/or other modes of communication. The contact center may manage centralized handling of individual communications, including email, faxes, social media, instant message, texts, letters, and/or other forms of communication. The contact center may include an automated service that provides a first level of customer support. The automated service may include IVR, VRU, Voice Portal, Speech Platform, Automated Assistant (e.g., multiple references), speech recognition software and/or other forms of interaction. At some point during the interaction, a customer may opt to speak with a live agent. The contact center may then transfer the customer to an agent or other customer representative.

An embodiment of the present invention is directed to routing the customer based on context data, which may also include real-time analytics of the customer and event history. Event history may include data relating to events that are changing in the environment outside of customer control. For example, because an entity's backend application is experiencing an out of service event, a customer trying to retrieve an account balance on the entity's website may get an error message. When the customer contacts the entity, the IVR will be informed that the customer is trying to get an account balance on the website and receiving an error message. Accordingly, the entity may automatically know the customer's current situation and advise the customer appropriately, e.g., the customer may be informed that a representative will call or text the customer with the requested information. Accordingly to another example, the agent or IVR may provide the customer with the requested account information when the customer calls or contacts the entity, e.g., provide customer's requested account balance.

An embodiment of the present invention may use SIP to pass context information in a custom header between standard SIP implementations. Also, an embodiment of the present invention may be extended to WebRTC which allows for multi-channel interaction, e.g., voice, chat, and video, etc. With WebRTC implementation, the custom header data may be extracted from SIP headers and delivered to the contact center agent with the RTC data channel. WebRTc can be from the customer as well and be converted to SIP headers to deliver to an Agent. An embodiment of the present invention may be extended to other signaling protocols.

An embodiment of the present invention may reduce and/or eliminate third party application program interface (API)/software development kit (SDK) for context delivery by passing the context information using call setup/signaling with the interaction. An embodiment of the present invention may further reduce and/or eliminate hardware, software and licensing costs for legacy implementation and may further reduce and/or eliminate points of failure in delivering this data. According to an embodiment of the present invention, voice may be carried over a data channel and may also include computer telephony integration (CTI) data as part of the same data channel. WebRTC from the client interaction perspective will allow the user to start a chat conversation and then change seamlessly to voice and/or video conversation without dropping the session and re-establishing the session when the channel is changed. This will allow the user to have a seamless interaction with the contact center to resolve the reason for the contact. Combining voice, video and chat into a single protocol and adding customer specific data, a system and method of an embodiment of the present invention realizes improved efficiencies and improved technology in customer servicing centers.

The Session Initiation Protocol (SIP) is a telecommunications protocol for signaling and controlling multimedia communication sessions. Common applications of SIP are in Internet telephony for voice and video calls, as well as instant messaging over Internet Protocol (IP) networks. The SIP protocol defines the messages that are sent between endpoints, which govern establishment, termination and other essential elements of a call. SIP can be used for creating, modifying and terminating sessions including one or several media streams.

SIP is independent from the underlying transport protocol. In other words, it runs on the Transmission Control Protocol (TCP), the User Datagram Protocol (UDP) or the Stream Control Transmission Protocol (SCTP). SIP can be used for two-party (unicast) or multiparty (multicast) sessions. SIP employs design elements similar to the HTTP request/response transaction model. For example, each transaction includes a client request that invokes a particular method or function on the server and at least one response. SIP reuses most of the header fields, encoding rules and status codes of HTTP, providing a readable text-based format.

WebRTC (Web Real-Time Communication) is an application programming interface (API) definition that supports browser-to-browser applications for voice calling, video chat, and peer to peer (P2P) file sharing without the need of either internal or external plugins. WebRTC provides browsers and mobile applications with Real-Time Communications (RTC) capabilities via simple APIs.

An embodiment of the present invention is directed to a method and system for storing, retrieving and/or analyzing customer context data for use in real-time analytics and proactive data delivery. According to an embodiment of the present invention, customer interaction data may be stored in a big data implementation, including distributed storage and distributed processing of very large data sets. When the customer starts interaction with an entity, such as a bank, financial institution, merchant, service provider, information service, intermediary, etc., an embodiment of the present invention may use the time required to authenticate the customer to run analytics on their past interactions and any changes to the customer's account. This initial interaction may include interaction with an automated service, such as an IVR. For example, the analytics may include identifying the last interaction, the problem resolved and whether there were any changes to the customer's account.

Depending on the particular industry, other determinations may be made and other data may be analyzed. The information may also be used for routing, agent selection, targeted marketing, and/or other interactions with the customer. An embodiment of the present invention provides a significant change in how business is conducted with customers based on real-time analytics. An embodiment of the present invention may be directed to real-time analytics based on information, such as past calling patterns, interactions with affiliates, transaction history, account activity, etc. This information may be used for current offerings and opportunities for marketing opportunities, including up-sell and cross-sell to customers. An embodiment of the present invention may improve overall key performance indicators on how a call center is measured and may further increase revenue and realize opportunities. An embodiment of the present invention may be applied to customers who contact call centers as well as other customer interactions.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

Figure 1:
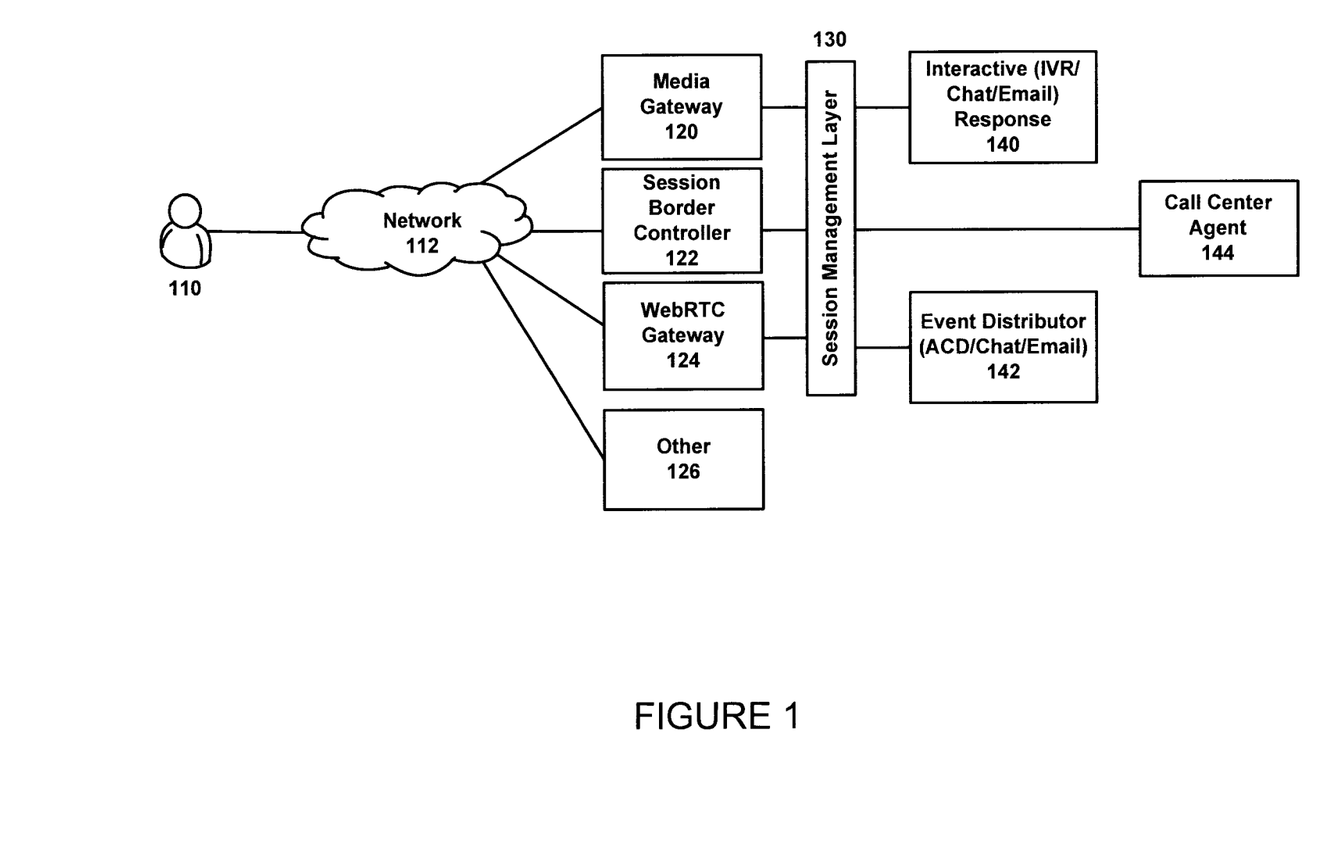
FIG. 1 is an exemplary diagram of a system for generating and transmitting context information in a contact center environment, according to an embodiment of the present invention.

FIG. 1 is an exemplary diagram of a system for generating and transmitting context information in a contact center environment, according to an embodiment of the present invention.

An embodiment of the present invention enables contact centers to receive customer interaction data and provide call control and call management. For example, custom SIP headers may pass an identifier, such as a key identifier, for the customer interaction data location to a communication device, e.g., a WebRTC phone, using a data channel, e.g., a RTC DataChannel. According to an exemplary embodiment of the present invention, WebRTC allows for building a custom user interface within a browser. With the placement of this contact application within the corporate website, when the user selects to interact with a contact center agent, the application may then send the data associated using the WebRTC data channel to a WebRTC gateway to be converted over to SIP custom header. This can be performed during a connection setup or negotiation with a light weight data element, for example. In addition, an embodiment of the present invention may be performed during a setup or negotiation using the RTCDataChannel keeping mind the maximum transmission unit (MTU) and other limits and further not fragmenting the packets.

As shown in FIG. 1, users 110 may interact with a contact center using various communication devices, such as a phone, mobile device, computer, laptop, tablet, etc. For example, the phone may be a TDM phone, VoIP phone, etc. The user may initiate an interaction via a network 112, which may include a public switched telephone network (PSTN), data network, mobile network etc. The network 112 may then pass the interaction to an appropriate device in the network. For example, network 112 may communicate with a Media Gateway 120, Session Border Controller 122, WebRTC Gateway 124 and/or other gateways/controllers represented by 126.

Media Gateway 120 may include a translation device or service that converts digital media streams between disparate telecommunications networks such as PSTN, SS7, Next Generation Networks (e.g., 2G, 2.5G and 3G radio access networks) or PBX. Media gateway 120 may enable multimedia communications across Next Generation Networks over multiple transport protocols such as Asynchronous Transfer Mode (ATM) and Internet Protocol (IP). Because a media gateway may connect different types of networks, it may convert between different transmission and coding techniques. For example, a media gateway used with SIP may be a stand-alone unit with its own call and signaling control integrated and may function as independent, intelligent SIP end-points. Voice over Internet Protocol (VoIP) media gateways may perform conversion between TDM voice to a media streaming protocol (e.g., Real-time Transport Protocol, RTP), as well as a signaling protocol used in the VoIP system.

Session Border Controller 122 may represent a device deployed in VoIP networks to exert control over the signaling and also the media streams involved in setting up, conducting, and tearing down telephone calls or other interactive media communications. Session Border Controller 122 may maintain full session state and provide various functions, including security, connectivity, quality of service, regulatory, media services, statistics and billing information, for example. Session Border Controller 122 may also translate SIP.

Session Border Controller 122 may represent a dedicated hardware device or software application that governs the manner in which phone calls are initiated, conducted and terminated on a VoIP network. For example, phone calls may be referred to as sessions. A SBC may act as a router between the enterprise and carrier service, allowing only authorized sessions to pass through the connection point (border). The SBC may further define and monitor the quality of service (QoS) status for sessions, ensuring that the callers can actually communicate with each other and that emergency calls are delivered correctly and prioritized above all other calls. An SBC may also serve as a firewall for session traffic, applying its own quality of service (QoS) rules and identifying specific incoming threats to the communications environment.

WebRTC Gateway 124 provides a bridge between Web protocols and SIP/IMS protocols. For example, WebRTC Gateways may enable real-time communication between any browsers in the market without requiring any additional plugin installation. The Gateway may leverage WebRTC technology and provide the necessary conversion into Telecom protocols. It also enables real-time communications from the web browsers into smartphones, tablets, PC softphones, SIP phones and GSM/PSTN phones.

The gateway/controller may then pass the interaction using standard SIP to a Session Management Layer 130. Session Management Layer 130 may then pass the interaction to an interactive voice response (IVR) component or another self-help chat or email response unit, represented by 140. For example, if the interaction is voice, Session Management Layer 130 may pass the interaction to IVR 140. IVR may represent a telephony technology in which a user uses a touch-tone telephone or other tone device to interact with a database to acquire information from or enter data into the database. IVR technology does not require human interaction over the telephone as the user's interaction with the database is predetermined by what the IVR system will allow the user access to. For example, banks and credit card companies may use IVR systems so that their customers can receive up-to-date account information instantly and easily without having to speak directly to a person. IVR technology is also used to gather information, as in the case of telephone surveys in which the user is prompted to answer questions by pushing the numbers on a touch-tone telephone The interaction data from Interactive Response may be cached. For example, caching may be performed if there is a large amount of context data to be passed to an agent. The function of the cache may store the information in-memory for a pre-determined period of time and create a unique key (or other identifier) that gets passed to the agent. The agent may then use the key/identifier to fetch the information from the in-memory source. The key in this exemplary scenario may be a location of this data, as well as a simple https webservice. For example, the interaction may then be passed with a transfer to Contact Center Agent 144 via an Event Distributor 142 (e.g., Auto Call Distributor (ACD), Routing Engine, etc.). The Event Distributor 142 may deliver or target a Contact Center Agent 144 based on rules configured with the ACD, routing engine and/or other processor. Session Management Layer 130 may then deliver the interaction data to a Call Center Agent 144 with the signaling (e.g., SIP or WebRTC).

According to an embodiment of the present invention, customer interaction data may be passed to the contact center agent 144 with a phone call from multiple sources, e.g., IVR, customer browsing the web, chat session etc. Current implementations in a contact center environment may require a third party CTI application to provide context data to the contact center agent. Eliminating the need for CTI and using SIP (e.g., call setup) signaling to pass the context data abstracts and standardizes the use of custom SIP headers An embodiment of the present invention further eliminates points of failure and hardware foot print used by Computer Telephony Integration.

Figure 2:
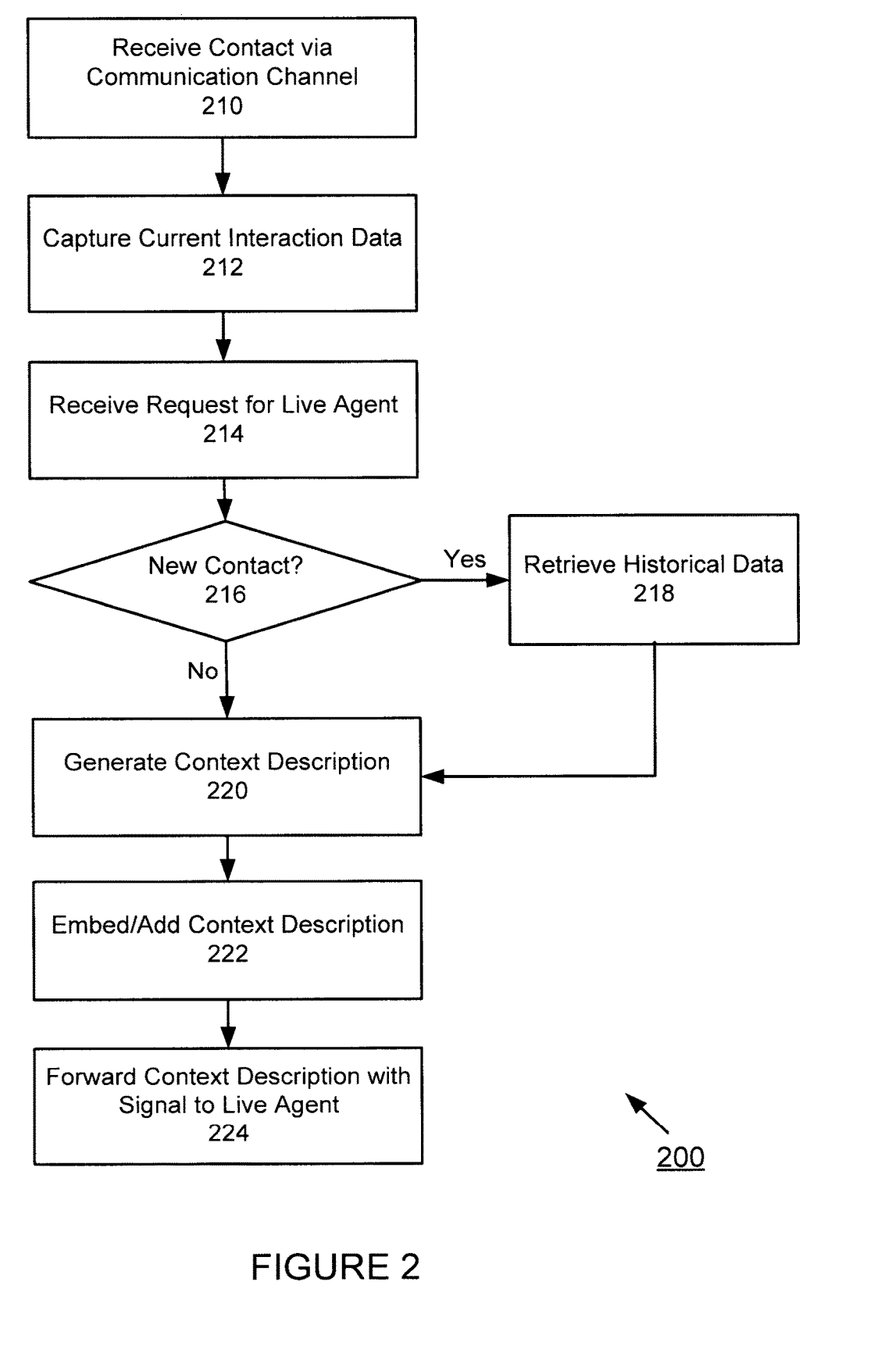
FIG. 2 is an exemplary detailed diagram of a method for generating and transmitting context information in a contact center environment, according to an embodiment of the present invention.

FIG. 2 is an exemplary detailed diagram of a method for generating and transmitting context information in a contact center environment, according to an embodiment of the present invention. At step 210, a user contact may be received via a communication channel. At step 212, during the user contact, the user may request a live agent. At step 214, user interaction data may be captured. At step 216, a determination may be made as to whether the contact is a new contact. At step 218, relevant data may be retrieved. At step 220, contact description may be generated. At step 222, the contact description may be embedded or added to the signal. At step 224, the contact data may be forwarded to a live agent. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a user contact may be received via a communication channel. The customer's contact may involve an initial interaction with an IVR or other automated entity. During the interaction, customer data may be received, such as customer identity, customer identifier, account number, etc. Authentication and/or other verification data may be accessed as well. The user contact may involve voice commands, touch-tone commands, biometrics, and/or other forms of interaction.

At step 212, user interaction data may be captured. The information gathered during the initial interaction with the IVR or other automated entity may be captured, stored and/or analyzed. Information may include current interaction data, such as customer requests, series of touch tones and underlying issues, voice commands, etc. Other information may be retrieved during the interaction, such as account status, geographic location, data relating to any patterns, etc. At step 214, during the user contact, the user may request a live agent.

At step 216, a determination may be made as to whether the contact is a new contact. If the contact is new, the process may flow to the generation context step at 220. Otherwise, prior data may be retrieved for analysis, at step 218. The data may include data from prior contacts made to the contact center associated with an entity as well as other forms of historical data, such as transaction history data, prior purchases, communication history data, prior contacts, etc. The data may also include other interactions, activities, made with the entity, via other forms of communication. Also, any update to the customer's account may be identified and analyzed.

At step 220, context description may be generated. The context description may include customer identification data (e.g., name, address, demographics, financials, etc.), account data (e.g., balance, late fees, charges, etc.), prior interactions (e.g., last interaction, last request, summary of prior contacts, error messages, etc.), current interaction (e.g., issues identified via IVR interaction, questions, issues, etc.) and special instructions (e.g., flags, alerts, warnings, customer requests, customer preferences, etc.). The context description may include a reference to other data. The reference may in a format such as ASCII characters, other character-encoding schemes, an XML string, key to a data store or other storage device, a link, a hyperlink, code, category, visual, link to data (including images, video, etc.).

The context description may also include real-time analytics, marketing opportunities, cross-selling opportunities, sales data, events, event history, reports, social media data, and/or other data as further described below in connection with FIGS. 3 and 4.

At step 222, the context description may be embedded or added to the signal. For example, the context description may be part of a SIP header. The context description may be embedded in various formats and may further reference various types of data.

At step 224, the context data may be forwarded to a live agent. When the customer is forwarded to the live agent, the live agent will have access to the context description provided via the signal. Because the information is sent with the signal, when the customer is forwarded to the live agent, the context description will also be made available. The context data may be provided via a user interface and/or other form of communication. Various graphics and/or other formats of data may be provided to better organize the context data.

With SIP, the context information may be passed as a custom header between standard SIP implementations. According to an embodiment of the present invention, this may also be extended to WebRTC which allows for multi-channel interaction (e.g., voice, chat, video, etc.). With WebRTC implementation, the custom header data may be extracted from SIP headers and delivered to a contact center agent with the RTC data channel. Other protocols may be implemented in accordance with the various embodiments of the present invention.

WebRTC API provides the basic capability of creating a soft phone within a browser and connecting two devices within and across a network using ICE (Interactive Connectivity Establishment). The signaling protocol used by WebRTC is SIP for setting up two users using a browser to talk, chat and converse with each other.

The embodiments of the present invention may be applied to various environments and applications. For example, in the utilities industry (e.g., electric, gas, phone, etc.), an embodiment of the present invention may be used to attach customer specific information such as account number, name, balance, etc. If reporting a service issue, a menu choice or a free-form text input may be available. If reporting a billing, information directed to what was the last menu option or self-serve the customer selected and what was the information that was provided to the customer may be provided.

In the finance industry (e.g., card, loan, etc.), if reporting a billing, information directed to what was the last menu option or self-serve the customer selected and what was the information that was provided to the customer may be obtained and provided.

In the services industry (e.g., airline, hotel, rental, etc.), in addition to the above use cases, an embodiment of the present invention may be directed to passing customer status for routing priority and to be handle by the appropriate group.

An embodiment of the present invention may eliminate third party API/SDK to deliver context information, instead deliver using the call setup/signaling with the interaction. In addition, an embodiment of the present invention may eliminate hardware, software and licensing costs for legacy implementation and further eliminate points of failure in delivering this data.

Figure 3:
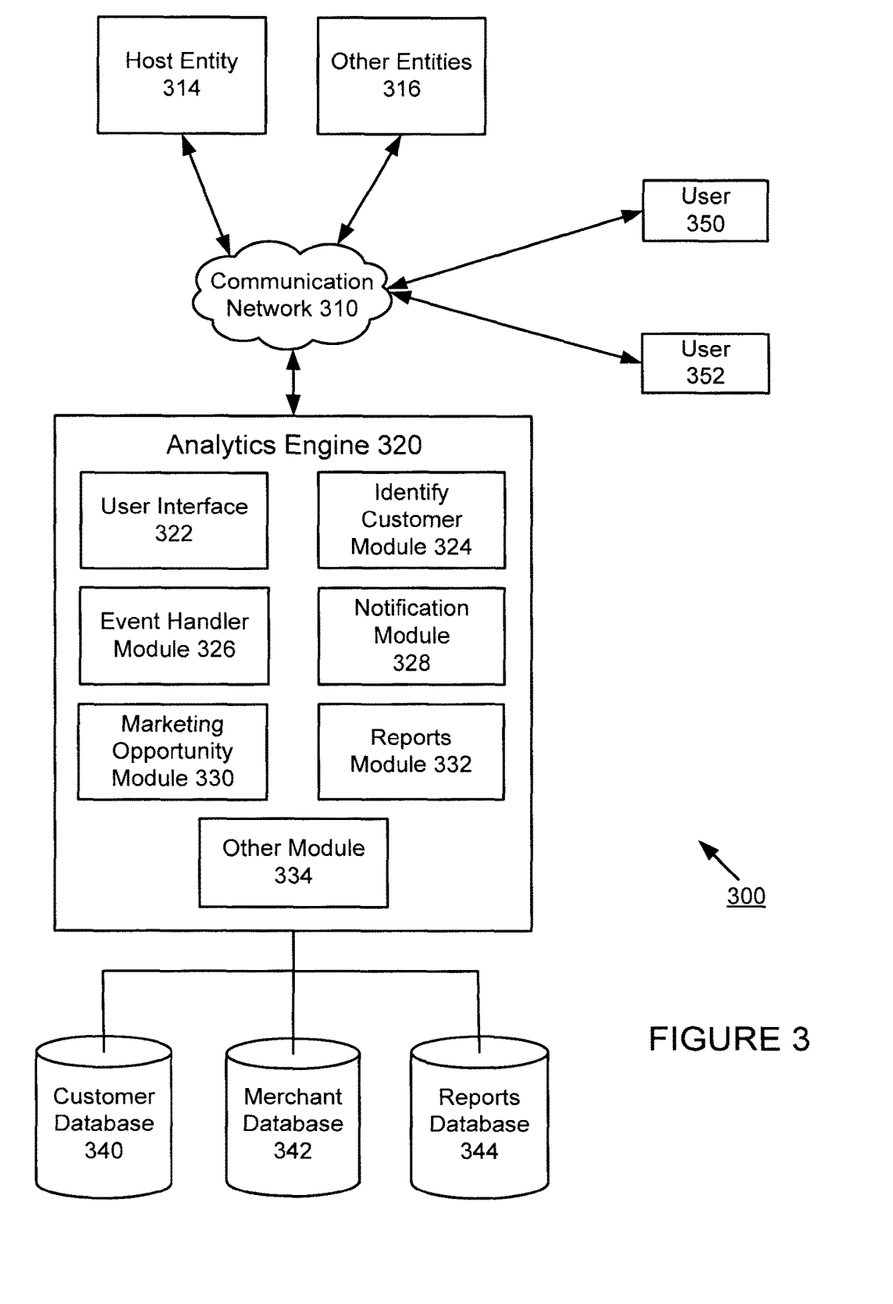
FIG. 3 is an exemplary diagram of a system for real-time analytics and proactive data delivery, according to an embodiment of the present invention.

FIG. 3 is an exemplary diagram of a system for real-time analytics and proactive data delivery, according to an embodiment of the present invention. A system 300 of an embodiment of the present invention may include one or more processors represented by Analytics Engine 320. The processors may be centrally located or distributed across multiple remote locations. Analytics Engine 320 may be accessed by various users 350, 352, including customers, consumers, engineers, system managers, executives, managers, finance managers, groups, divisions and/or other users via a communication device. The user may establish a communication session using a communication device via a communication network 310. The communication device may be a computer, laptop, mobile device, phone, and/or any device that can communicate with another device.

Analytics Engine 320 may be stand alone or hosted by an entity 314, such as a financial institution, service provider, corporation, company, facility, merchant, bank, etc. and/or other entity represented by 316. For example, Analytics Engine 320 may be affiliated or associated with a host entity and/or other entity. In an exemplary embodiment, a Host Entity 314 may host or support Analytics Engine 320. In this example, the implementation of generating and transmitting context data in a multi-channel environment of an embodiment of the present invention may appear to be performed by a host entity, as a single consolidated unit. According to another example, Analytics Engine 320 may be separate and distinct from Host Entity 314. For example, Host Entity 314, or other entity, may communicate to Analytics Engine 320 via a network or other communication mechanism, as shown by Communication Network 312.

Analytics Engine 320 may access databases and/or other sources of information to make determinations and perform analysis. Analytics Engine 120 may access and/or maintain Customer Database 340, Merchant Database 342, Reports Database 344 and other Databases or other forms of memory/storage.

Customer Database 340 may maintain and manage user information. A user profile may include user identification information, demographic information, prior history, prior transactions, user preferences, etc.

Merchant Database 342 may manage marketing data, merchant sales opportunity data, inventory data, product/service data, etc.

Reports Database 344 may also store reports as well as manage alerts and/or other schedules. Reports may be stored to perform system analysis, run statistics and perform prediction analysis. In addition, alerts may be programmed for various events, e.g., fraud alert, breach, etc. Reports/Alerts Database 344 may store reports as well as manage alerts and/or other schedules. Reports may be stored to perform system analysis, run statistics and perform prediction analysis. In addition, alerts may be programmed for various events.

While a single database is illustrated in the exemplary figure, the system may include multiple databases at the same location or separated through multiple locations. The databases may be further combined and/or separated. In addition, the databases may be supported by Host Entity 314 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Analytics Engine 320 may include various modules and interfaces for real-time analytics, according to an embodiment of the present invention. Analytics Engine 120 may include User Interface 322, Identify Customer Module 324, Event Handler Module 326, Notification Module 328, Marketing Opportunity Module 330, Reports Module 332, and/or other modules, interfaces and/or processors, as represented by Other Module 334. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Analytics Engine 320 may be accessed via various modes of communication. For example, a user may communicate via Communication Network 310 through various channels, including a voice channel, a video channel, IVR channel, web channel, data channel, mobile application, etc. Other forms of communication may also include in-person, mail and other mode of communication or interaction.

According to another embodiment of the present invention, Analytics Engine 320 may host a website or other electronic interface where users may access data as well as provide data. Analytics Engine 320 may communicate with various entities via communication network 310.

Identify Customer Module 324 may identify or categorize the customer. The customer may be identified by name, alias, identifier, account number, login and password combination, and/or other form of identification. The customer may also be identified by a biometric, such as a voiceprint, authentication phrase, and/or other unique characteristics. The customer may be identified via various channels, including voice channel, email, chat, in-person, etc. Depending on the channel, an appropriate identification/authentication process may be applied. The customer may be categorized by request, need, and/or other factor or metric.

Event Handler 326 may analyze one or more events and determine or identify any issues. For example, Event Handler 326 may identify issues for a particular customer as well as issues for a wider group of users. According to this example, Event Hander 326 may determine that a specific geographic area is having problems accessing an online interface (e.g., online sale event, etc.). Also, a particular merchant may be experiencing technical and other difficulties. A particular service or product may be malfunctioning, etc. Event Handler 326 may also identify that a particular channel of communication is experiencing technical difficulties (e.g., emails are not getting through, etc.). Event Handler 326 may also analyze customer spend data, as well as various forms of structured and unstructured data (e.g., system log files, social media feeds, etc.) to identify issues as well as opportunities. Accordingly, analyzing this data provides contact centers the ability to better address and remedy issues during the customer interaction.

Notification Module 328 may notify a customer when an issue is remedied, corrected and/or otherwise addressed. Some issues may require additional time and resources. For such issues, an embodiment of the present invention may notify the customer about the status, including time to completion, progress, alternate options, instructions, completion, etc. Also, the customer may specify a preferred mode of communication for notifications, e.g., text message, voice mail, phone call, etc. Marketing Opportunity Module 330 may identify marketing, sales and/or other opportunities for a particular customer, type of customer, etc. An embodiment of the present invention may perform real-time analytics to identify potential upsell opportunities. These opportunities may be presented or communicated to the user during the user initiated contact. In addition, long-term analytics may be performed where an embodiment of the present invention may present additional opportunities to the user at the next communication or during a new communication (e.g., follow-up with an email notification, text message, voicemail, personalized message on the customer's next online visit, etc.). The opportunities may be customer specific as well as merchant-specific.

Report Module 332 may generate reports, interfaces, analysis, etc. The output may be an interactive interface where an operator or other user may submit requests and perform analysis. The output may be provided to a mobile device, e.g., phone, tablet, laptop, computer, etc. The output may be send to multiple recipients via various modes of communication (e.g., email, text, voicemail, etc.). Each report generated may be stored, e.g., Reports/Alerts Database 344, etc. Also, alerts may be managed and/or programmed for certain events or particular customers.

Figure 4:
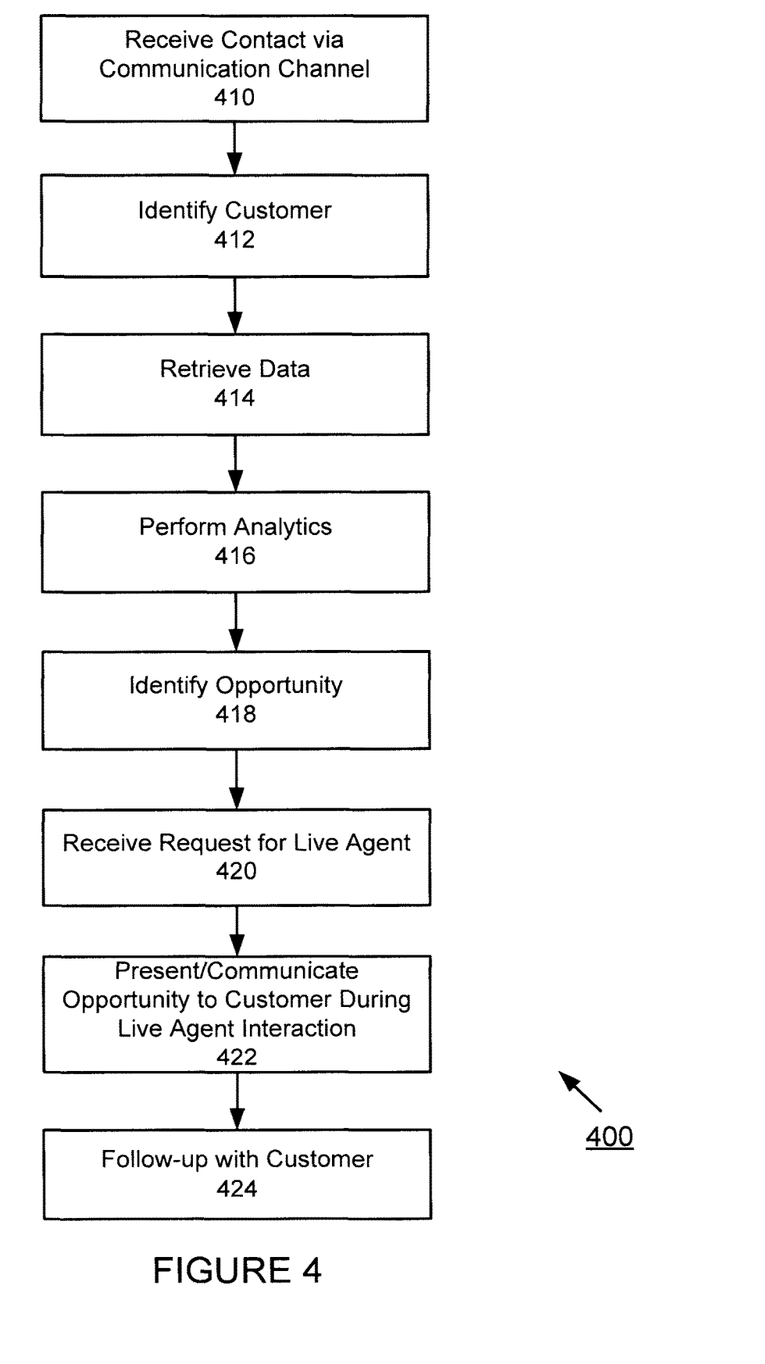
FIG. 4 is an exemplary detailed diagram of a method for implementing real-time analytics, according to an embodiment of the present invention.

FIG. 4 is an exemplary detailed diagram of a method for implementing real-time analytics, according to an embodiment of the present invention. At step 410, a customer contact may be received. At step 412, the customer may be identified. At step 414, customer data and/or other relevant data may be retrieved. At step 416, analytics may be performed. At step 418, marketing and/or other opportunities may be identified. At step 420, a request for a live agent may be received. At step 422, the identified opportunity may be presented to the customer during the contact. At step 424, a follow-up communication may be applied. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, customer contact may be received. A user contact may be received via various types of communication channels. The customer's contact may involve an initial interaction with an IVR or other automated entity.

At step 412, the customer may be identified. During the interaction, customer data may be received, such as customer identity, customer identifier, account number, etc. Authentication and/or other verification data may be accessed as well. The user contact may involve voice commands, touch-tone commands, biometrics, and/or other forms of interaction.

At step 414, customer data and/or other relevant data may be retrieved. Customer data may include the customer's initial interaction with the IVR or other automated entity, such as current interaction data, customer requests, series of touch tones and underlying issues, voice commands, etc. Other information may be retrieved during the interaction, such as account status, geographic location, data relating to any patterns, etc. Other data may include customer identification data (e.g., name, address, demographics, financials, etc.), account data (e.g., balance, late fees, charges, etc.), prior interactions (e.g., last interaction, last request, summary of prior contacts, etc.), current interaction (e.g., issues identified via IVR interaction, questions, issues, etc.) and special instructions (e.g., flags, alerts, warnings, customer requests, customer preferences, etc.).

At step 416, analytics may be performed. The analysis may be performed in real-time during the customer contact.

At step 418, marketing and/or other opportunities may be identified. Based on the analysis, upselling and/or cross-selling opportunities may be identified. For example, the customer may call a contact center to obtain details on a savings account balance. An embodiment of the present invention may analyze the customer's data and determine that the customer may be interested in an investment product. For example, an embodiment of the present invention may identify the customer as a high wealth customer and provide targeted opportunities. An embodiment of the present invention may also gather information from various social media websites to identify the customer's interests, associations, affiliations, and potential purchase opportunities. For example, an embodiment of the present invention may recognize that the customer has been doing online research for a new car. This information may be gathered from various sources, e.g., social media, merchant websites, etc. For this customer, an embodiment of the present invention may offer an auto loan. This offer may be further customized for the type of car that the customer has been researching or requesting quotes for.

According to another embodiment of the present invention, a merchant may recognize spending patterns for a customer and provide targeted opportunities during customer interactions. An embodiment of the present invention may also consider the customer's inquiries, complaints, and/or other communications to generate a customized offer and/or to further refine existing offers. Other variations may be implemented.

At step 420, a request for a live agent may be received. Also, an embodiment of the present invention may identify an opportunity and connect the customer with a live agent, with or without the customer's request to be transferred. This may occur for opportunities that are particularly relevant to the customer. Other factors, such as inventory and timing may also be considered.

At step 422, the identified opportunity may be presented to the customer during the contact. Also, the opportunity may be presented via other forms of communication, e.g., text, email, next online interaction, voicemail, subsequent social media interaction, etc.

At step 424, a follow-up communication may be applied. The follow-up communication may be optional. The opportunity may be the same, similar or related to the opportunity identified in step 418. Also, depending on the customer's reaction or response, a modified opportunity may be identified and presented to the customer. For example, the follow-up communication may include an improved offer to the customer to better encourage the customer to act. The follow-up communication may also target purchases or services that are related to or otherwise associated with the initial offer. Other variations may be implemented.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, RUM Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented system for transmitting context data during an automated customer interaction in a multi-channel environment, wherein the system comprising:
   a computer store containing data, for each customer, defining a customer's historical interactions with an entity and account information,
   a computer processor, coupled to the computer store and programmed to:
      receive, via an electronic input, a contact from a customer via an electronic communication channel;
      automatically capture current interaction data between the customer and an automated interactive entity;
      receive an electronic request for a live agent from the customer;
      retrieve, from the computer store, historical interaction data from a prior customer contact and account information;
      execute real-time analytics to identify a customized marketing opportunity;
      generate context description that comprises information from the current interaction data, historical interaction data, real-time analytics and account information;
      embed the context description into a signal as a header; and
      transmit, using a computer processor, the signal with the context description to the live agent.

2. The system of claim 1, wherein the header is a SIP header.

3. The system of claim 1, wherein the header is extracted from a SIP header.

4. The system of claim 1, wherein the context description is used to route the signal to an appropriate live agent.

5. The system of claim 1, wherein the automated interactive entity comprises an interactive voice response unit.

6. The system of claim 1, wherein the historical interaction data comprises social media data.

7. The system of claim 1, wherein the historical interaction data comprises prior transaction data.

8. The system of claim 1, wherein the computer processor is further programmed to identify a marketing opportunity customized for the customer.

9. The system of claim 8, wherein the marketing opportunity comprises a cross-selling opportunity associated with another entity.

10. The system of claim 8, wherein the marketing opportunity is provided to the customer from the live agent during the customer contact.

11. An automated computer implemented method for transmitting context data during an automated customer interaction in a multi-channel environment, wherein the method comprising the steps of:
   receiving, via an electronic input, a contact from a customer via an electronic communication channel;
   automatically capturing current interaction data between the customer and an automated interactive entity;
   receiving an electronic request for a live agent from the customer;
   retrieving, from a computer store, historical interaction data from a prior customer contact and account information;
   executing real-time analytics to identify a customized marketing opportunity;
   generating context description that comprises information from the current interaction data, historical interaction data, real-time analytics and account information;
   embedding the context description into a signal as a header; and
   transmitting, using a computer processor, the signal with the context description to the live agent.

12. The method of claim 1, wherein the header is a SIP header.

13. The method of claim 1, wherein the header is extracted from a SIP header.

14. The method of claim 1, wherein the context description is used to route the signal to an appropriate live agent.

15. The method of claim 1, wherein the automated interactive entity comprises an interactive voice response unit.

16. The method of claim 1, wherein the historical interaction data comprises social media data.

17. The method of claim 1, wherein the historical interaction data comprises prior transaction data.

18. The method of claim 1, further comprising the step of: identifying a marketing opportunity customized for the customer.

19. The method of claim 18, wherein the marketing opportunity comprises a cross-selling opportunity associated with another entity.

20. The method of claim 18, wherein the marketing opportunity is provided to the customer from the live agent during the customer contact.

* * * * *